US012782583B2

(12) United States Patent
Kazakevich et al.

(10) Patent No.: US 12,782,583 B2
(45) Date of Patent: Nov. 3, 2026

(54) COMMUNICATIONS SYSTEM USING PAA AND LMS FILTER FOR REMOVING JAMMING SIGNALS

(71) Applicant: Viavi Solutions, Inc., Chandler, AZ (US)

(72) Inventors: Leonid Kazakevich, Plainview, NY (US); Gregor Said Jackson, Las Vegas, NV (US)

(73) Assignee: Viavi Solutions, Inc., Chandler, AZ (US)

( * ) Notice: Subject to any disclaimer, the term of this patent is extended or adjusted under 35 U.S.C. 154(b) by 295 days.

(21) Appl. No.: 18/767,148

(22) Filed: Jul. 9, 2024

(65) Prior Publication Data

US 2026/0019187 A1 Jan. 15, 2026

Related U.S. Application Data

(60) Provisional application No. 63/545,108, filed on Oct. 20, 2023.

(51) Int. Cl.
*G01S 19/36* (2010.01)
*G01S 19/21* (2010.01)

(52) U.S. Cl.
CPC ............ *G01S 19/215* (2013.01); *G01S 19/36* (2013.01)

(58) Field of Classification Search
CPC ............................... G01S 19/215; G01S 19/36
USPC .............................................................. 455/1
See application file for complete search history.

(56) References Cited

U.S. PATENT DOCUMENTS 5,952,968 A * 9/1999 McDowell .............. G01S 19/36 342/383
6,336,076 B1 * 1/2002 Farley ...................... G01S 19/11 342/357.41
6,448,925 B1 * 9/2002 Shridhara ............... G01S 5/011 342/357.77
6,590,528 B1 * 7/2003 DeWulf .................. G01S 19/36 342/383
6,598,009 B2 * 7/2003 Yang ......................... H01Q 3/30 342/423
6,828,935 B1 * 12/2004 Dunn ....................... H01Q 3/26 342/383
6,940,453 B2 * 9/2005 Kim ....................... H01Q 3/267 342/368

(Continued)

*Primary Examiner* — April G Gonzales
(74) *Attorney, Agent, or Firm* — Farjami & Farjami LLP

(57) ABSTRACT

Disclosed is a system for communications that includes a PAA that receives communication signals from satellites and also receives jamming signals. A pre-beam formatting block receives the PAA's output and forms preliminary desired beams and omni beams. A first LMS filter block receives the preliminary desired beams and the omni beams and outputs filtered beams that are substantially free of the jamming signals. A beamforming block receives the filtered beams and provides directed filtered beams to a max select block. The max select block outputs selected directional beams that are highly correlated with the communications signals from the satellites. The selected directional beams are substantially free of the jamming signals. The system can include a second LMS filter block that receives the selected directional beams and the omni beams. The second LMS filter block further removes any jamming signals from the selected directional beam.

21 Claims, 6 Drawing Sheets

(56) References Cited

U.S. PATENT DOCUMENTS

| | | | | |
|---|---|---|---|---|
| 6,961,017 | B1* | 11/2005 | Naylor | H04K 3/90 342/357.29 |
| 7,010,262 | B2* | 3/2006 | Tyson | G01S 5/04 342/357.29 |
| 7,250,903 | B1* | 7/2007 | McDowell | H04K 3/228 342/357.59 |
| 7,853,195 | B2* | 12/2010 | Higgins | H04B 1/525 455/114.2 |
| 9,571,205 | B1* | 2/2017 | Suarez | G02F 1/225 |
| 10,031,234 | B1* | 7/2018 | Alexander | G01S 19/53 |
| 10,371,822 | B2* | 8/2019 | Apker | G01S 19/23 |
| 10,809,383 | B2* | 10/2020 | Piper | H01Q 3/2682 |
| 11,194,053 | B1* | 12/2021 | Johnston | G01S 19/37 |
| 11,831,679 | B2* | 11/2023 | Bouthemy | G01S 19/215 |
| 12,210,104 | B2* | 1/2025 | Mohan | G01S 19/015 |
| 2004/0239559 | A1* | 12/2004 | King | H04K 3/90 342/357.59 |
| 2005/0201457 | A1* | 9/2005 | Allred | H03H 21/0012 375/232 |
| 2008/0045154 | A1* | 2/2008 | Wu | H04B 7/043 455/65 |
| 2008/0062039 | A1* | 3/2008 | Cohen | H04K 3/255 342/357.29 |
| 2010/0007554 | A1* | 1/2010 | Wang | G01S 19/02 342/357.29 |
| 2010/0289687 | A1* | 11/2010 | Vander Velde | F41G 7/222 342/16 |
| 2011/0275308 | A1* | 11/2011 | Grobert | H04K 3/42 455/1 |
| 2012/0086597 | A1* | 4/2012 | Sin | G01S 19/21 342/357.23 |
| 2014/0002303 | A1* | 1/2014 | Sin | G01S 19/27 342/357.59 |
| 2015/0133171 | A1* | 5/2015 | Bani Hani | G01S 19/36 455/456.6 |
| 2017/0003394 | A1* | 1/2017 | Revol | G01S 19/21 |
| 2017/0227650 | A1* | 8/2017 | Grobert | H04K 3/65 |
| 2021/0084407 | A1* | 3/2021 | Jensen | H04R 1/1083 |
| 2021/0208286 | A1* | 7/2021 | Turpin | G01S 3/38 |
| 2021/0266091 | A1* | 8/2021 | Azoulai | H04K 3/90 |
| 2021/0311161 | A1* | 10/2021 | Reis | G01S 19/00 |
| 2022/0146687 | A1* | 5/2022 | Zarowski | G01S 19/23 |
| 2022/0215761 | A1* | 7/2022 | Bowyer | G08G 5/20 |
| 2023/0268942 | A1* | 8/2023 | Ghannouchi | H04B 1/0475 375/297 |
| 2023/0327797 | A1* | 10/2023 | Petersen, III | H04W 56/0015 455/1 |
| 2024/0036217 | A1* | 2/2024 | Bageshwar | G01S 19/49 |
| 2024/0053485 | A1* | 2/2024 | Bageshwar | G01S 13/86 |
| 2025/0004140 | A1* | 1/2025 | Weger | G01S 19/015 |
| 2025/0130335 | A1* | 4/2025 | Kazakevich | G01S 19/215 |

* cited by examiner

LMS FILTER

COMMUNICATIONS SYSTEM USING PAA AND LMS FILTER FOR REMOVING JAMMING SIGNALS

CLAIM OF PRIORITY

The present application claims the benefit of and priority to a provisional patent application entitled "Phased Antenna Arrays Using LMS Filters," Ser. No. 63/545,108 filed on Oct. 20, 2023. The disclosure in that pending provisional application is hereby incorporated fully by reference into the present application.

BACKGROUND

There are many techniques to reduce the effect of jamming signals in satellite communications, most of the time—for example, CRPA (Control Receive Pattern Antenna). The CRPA technique combines time-delayed and scaled received signals on multiple antenna elements to dynamically alter the reception pattern, placing pattern nulls in the angle-of-arrival of a jamming source. The CRPA solution requires a long time to detect directions and calculate patterns, also there is no gain improvement directed to the satellites.

Further, scatterings is a significant problem in techniques like CRPA and limits their applications in reflection-rich environment. In addition, jammers adversely affect the cancellation algorithms of conventional techniques such as CRPA. Moreover, conventional techniques such as CRPA require a long time, in the order of tens of milliseconds, to compute several nulls. This long time significantly reduces the utility of the conventional techniques for removing jamming signals directed to high mobility vehicles, such as airplanes. Further, in conventional techniques such as CRPA, satellite locations are not known and are not taken into account, and nulls are placed wherever large energy beams of jamming signals are detected without regard to satellite locations or whether a large energy beam was incoming from a satellite. Thus, CRPA nulls may help or hurt incoming signals from a satellite. CRPA does not produce gains towards incoming signals from satellites, but only produces attenuation towards jamming signals.

Accordingly, there is need in the art for a robust anti-jamming system that removes jamming signals in satellite communications with little delay and is suitable in communications with high mobility vehicles, while producing gain towards incoming satellite signals and significantly improving satellite signal reception.

SUMMARY

The present disclosure is directed to a communications system using PAA (Phased Antenna Array) and LMS (Least Mean Squares) filter for removing jamming signals substantially as shown in and/or described in connection with at least one of the figures, and as set forth in the claims.

DETAILED DESCRIPTION

Figure 1:
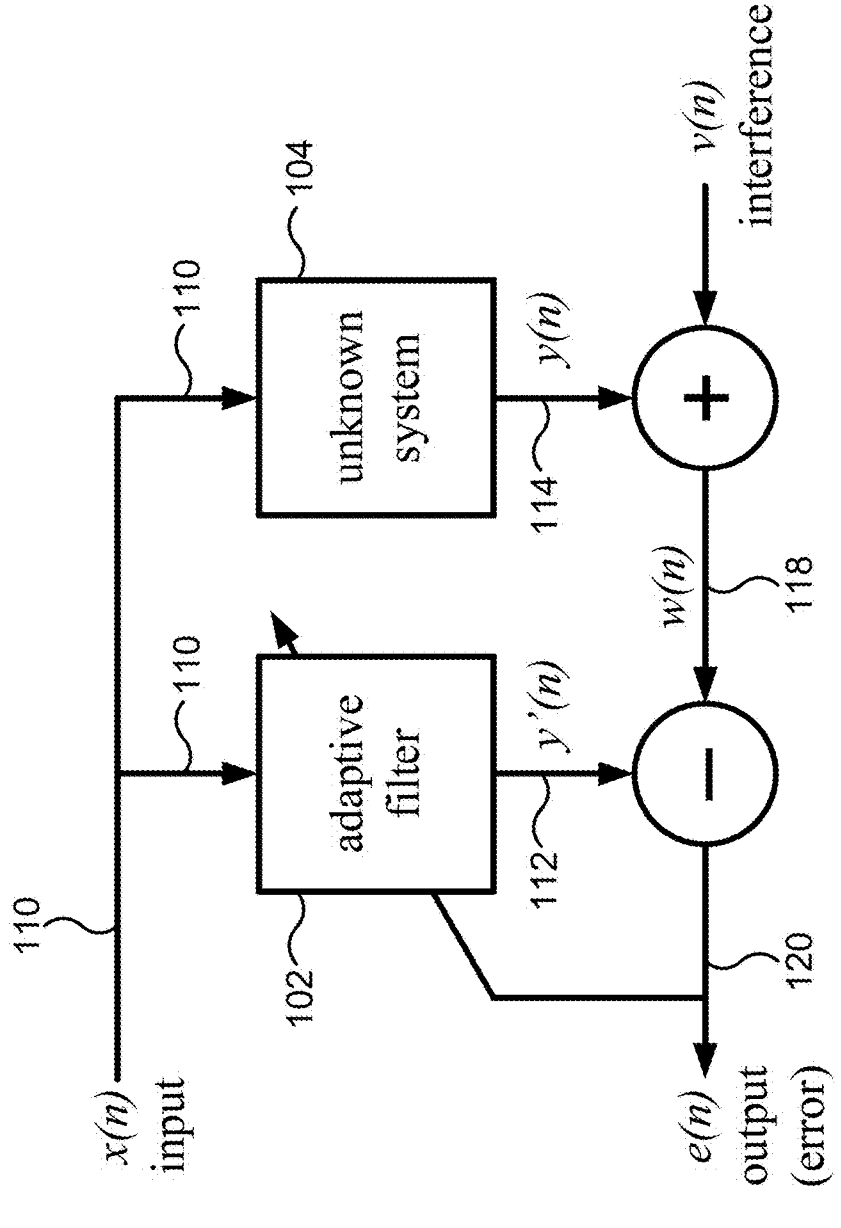
FIG. 1 shows various parts of an exemplary LMS (Least Mean Squares) filter.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

In one implementation of the present inventive concepts, a Phased Antenna Array (PAA) is utilized to receive satellite signals (such as GNSS signals) and steer beams and nulls in conjunction with interference reduction techniques by LMS (Least Mean Squares) filters. As shown and discussed in more detail below, the PAA also known as a phased array antenna or simply phased array, is a type of antenna system that consists of multiple individual antenna elements arranged in a specific geometric pattern. These elements work together to achieve various signal processing objectives, such as steering the antenna's beam in a particular direction, forming multiple receive or transmit beams, or suppressing interference.

The ability of PAAs to electronically steer beams and adapt to changing conditions makes them versatile and valuable tools for improving signal reception, transmission, and interference rejection. The main principles of a phased antenna array, as briefly described below, include phase shifting, amplitude control, beam forming, array geometry, interference control, adaptive receive or transmit beam forming, electronic scanning, and signal processing.

Phase Shifting: Each antenna element in the array can be electronically controlled to introduce a specific phase shift to the signal it receives or transmits. This phase shift determines the direction in which the antenna array's main beam is pointing. By adjusting the phase of each element, the array can steer the beam electronically without physically moving the antenna.

Amplitude Control: In addition to phase control, phased arrays can adjust the amplitude (signal strength) of individual elements to further shape the radiation pattern and optimize performance.

Beam Forming: By carefully controlling the phase and amplitude of each element in the array, the phased antenna array can shape its radiation pattern to concentrate the energy in a specific direction. This is known as beam forming and allows for directional signal reception or transmission, enhancing signal strength and coverage in the desired direction while minimizing signal leakage in unwanted directions.

Array Geometry: The spatial arrangement of the individual antenna elements within the array is critical to achieving specific beam forming objectives. Different array geometries, such as linear, planar, or conformal arrays, offer unique advantages for different applications.

Interference Control: Phased arrays can adjust the phase and amplitude of individual elements to selectively cancel or suppress unwanted interference. This capability is particularly useful in applications where signal reception or transmission is affected by nearby interference sources, such as in radar or communication systems.

Adaptive Beam Forming: Phased arrays can adapt their beam forming patterns in real-time based on the changing environment. This adaptive capability is useful for tracking moving targets, rejecting interference, and optimizing signal reception or transmission under dynamic conditions.

Electronic Scanning: Traditional antennas rely on mechanical movement to change their orientation and steer their beams. In contrast, phased arrays can electronically scan their beams quickly and precisely without any physical movement. This electronic scanning capability is advantageous in applications requiring rapid beam repositioning, such as tracking targets in radar systems or maintaining satellite communication links.

Signal Processing: Phased antenna arrays often require complex signal processing algorithms to calculate the appropriate phase and amplitude adjustments for each element based on the desired beam forming or interference mitigation goals. Digital signal processing (DSP) techniques are commonly used for this purpose.

The present inventive concepts utilize Least Mean Squares ("LMS") filters in conjunction with PAAs for removing jamming signals. LMS filters are a class of adaptive filters that are able to learn an unknown transfer functions. LMS filters use a gradient descent method in which the filter coefficients are updated based on the instantaneous error signal to find filter coefficients that produce the least mean square of the error signal (difference between the desired and the actual signal). FIG. 1 shows the various parts of an exemplary LMS filter. Input signal x(n) 110 is received and transformed by an unknown system 104 that is be matched using adaptive filter 102. Adaptive filter 102 produces output y'(n) 112. Output y(n) 114 of unknown system 104 is interfered with by a noise signal, for example, a jamming signal v(n) 116, producing w(n) 118. That is w(n)=y(n)+v(n).

Error signal e(n) 120 is then computed as e(n)=w(n)-y'(n)=y(n)+v(n)-y'(n) and is fed back to adaptive filter 102, to adjust its parameters in order to minimize the mean square of error signal e(n) 120.

In one implementation, the present inventive concepts are utilized in anti-jamming techniques for devices receiving satellite signals using LMS filters and phased antenna arrays. Satellite signals for navigation and communications have low power at receive point due to long distances from LEO (low earth orbit) and MEO (medium earth orbit), which make these signals susceptible to jamming. The jamming signals typically originate from a ground stations, ground vehicles or drones. There are many techniques to reduce the jamming effect, most of the time—for example, CRPA (Control Receive Pattern Antenna). The CRPA technique combines time-delayed and scaled received signals on multiple antenna elements to dynamically alter the reception pattern, placing pattern nulls in the angle-of-arrival of a jamming source. However, the CRPA technique requires a long time to detect directions and calculate patterns, also there is no gain improvement directed to the satellites.

Figure 2:
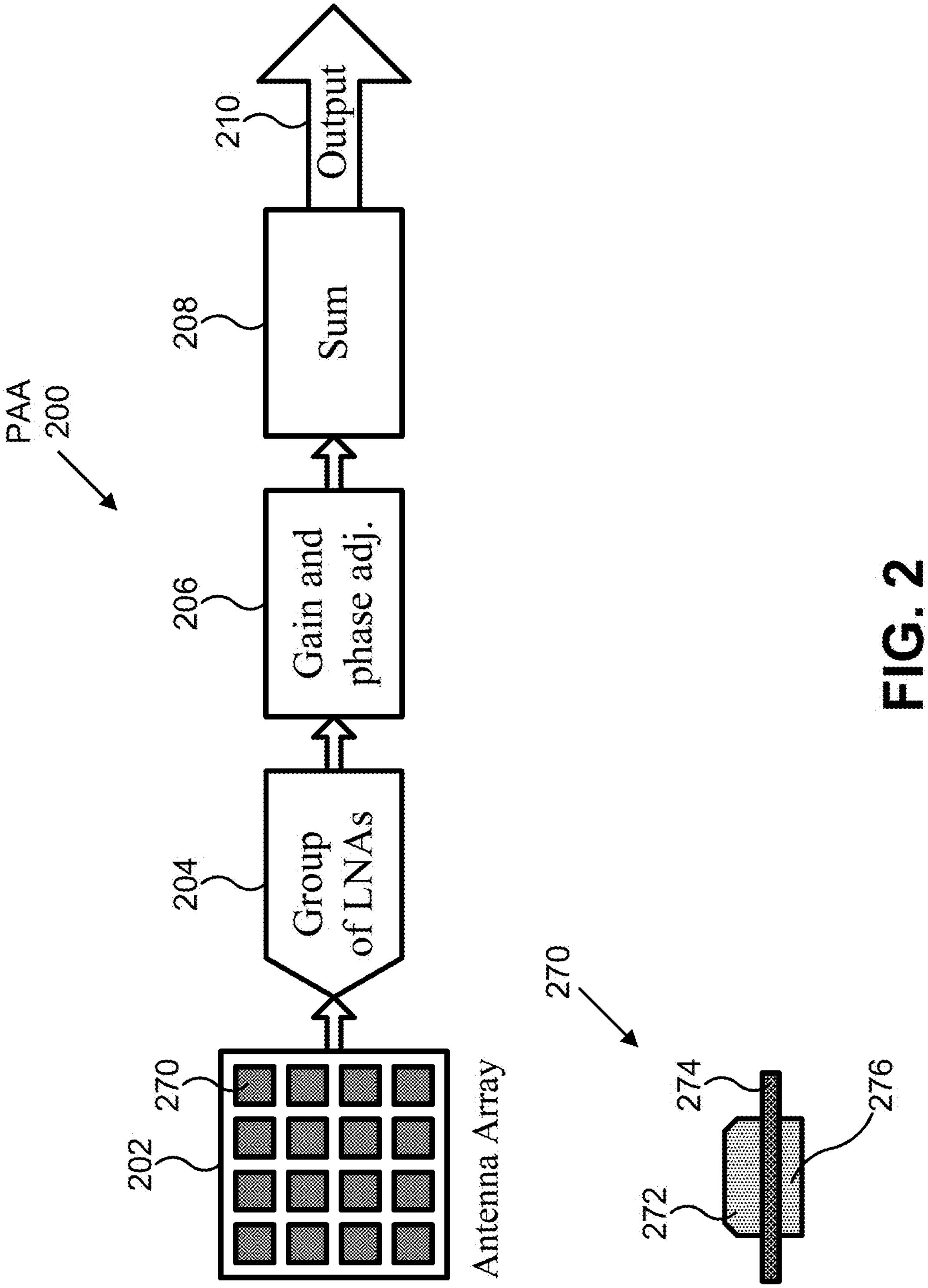
FIG. 2 shows one exemplary implementation of a Phased Antenna Array (PAA).

Referring to FIG. 2, according to one implementation of the present application, PAA 200 comprises antenna array 202, group of low noise amplifiers (LNAs) 204, gain and phase adjustment module 206 and summing module 208. In the present example, antenna array 202 is an array of 16 antennas 270 arranged in four rows and four columns. However, any other number of antennas 270 with various number of rows or columns may be used according to the present disclosure. An exemplary implementation of antenna 270 is shown in FIG. 2. Segment 272 of antenna 270 receives satellite signals while segment 276 receives primarily jamming signals. PCB (printed circuit board) 274 is situated between segment 272 and segment 276 of antenna 270.

Satellite communication signals received by the multiple antennas in antenna array 202 are provided to LNAs 204 for amplification and the output of LNAs 204 is provided to gain and phase adjustment module 206, which can vary the gain and phase of each analog output corresponding to each antenna in antenna array 202. The gain and phase adjusted outputs of all antennas provided by antenna array 202 and LNAs 204 are combined in summing module 208 to generate PAA output 210. It is noted that in the exemplary implementation in FIG. 2, PAA output 210 is produced by analog combining in RF (radio frequency) the outputs of all antennas provided by antenna array 202 and LNAs 204. PAA output 210 will be used in an LMS-based jamming removing system as will be discussed further below.

Figure 3:
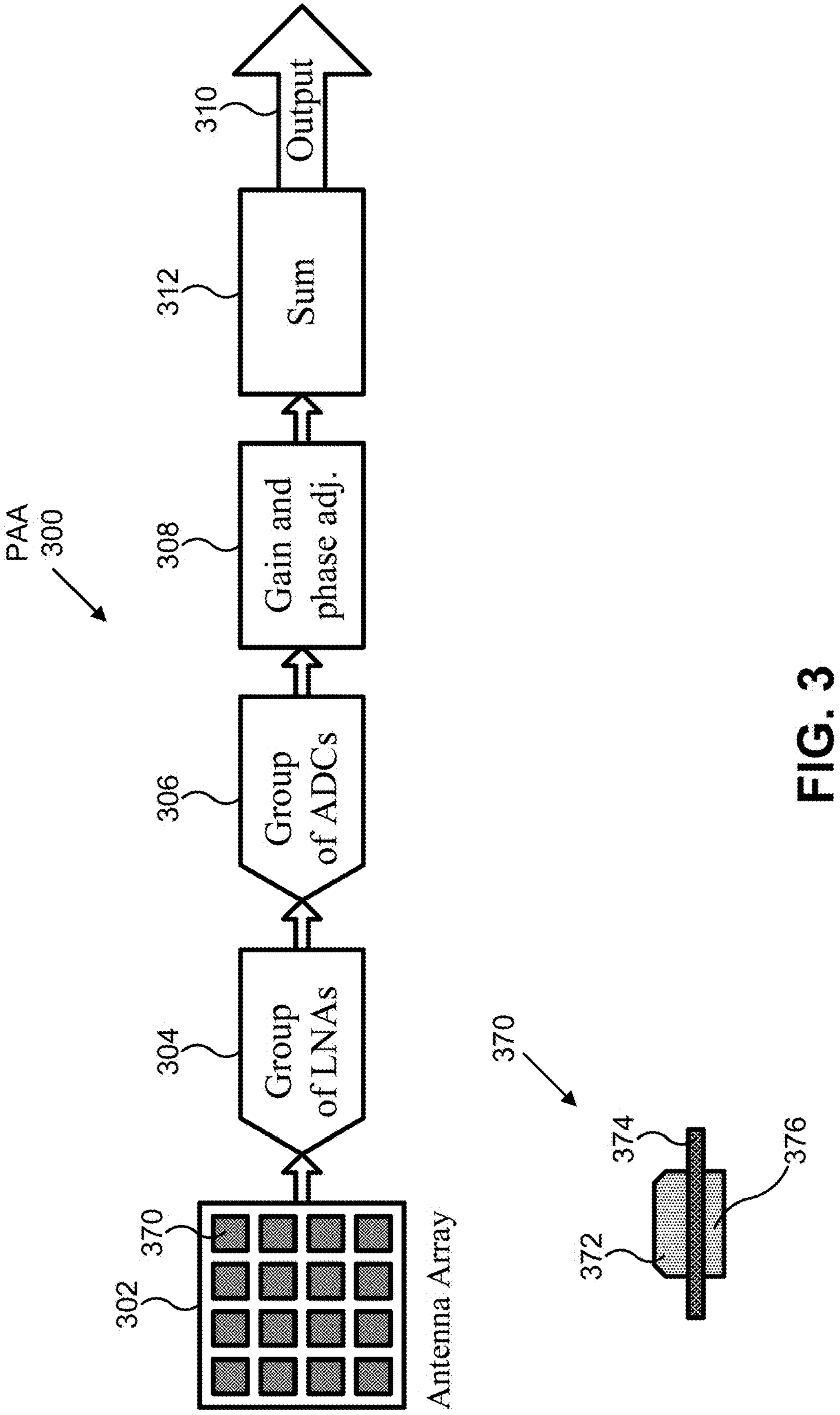
FIG. 3 shows another exemplary implementation of a PAA.

Referring to FIG. 3, according to another implementation of the present application, PAA 300 comprises antenna array 302, group of low noise amplifiers (LNAs) 304, group of ADCs (analog to digital converters) 306, gain and phase adjustment module 308, and summing module 312. In the present example, antenna array 302 is an array of 16 antennas 370 arranged in four rows and four columns. However, any other number of antennas 370 with various number of rows or columns may be used according to the present disclosure. An exemplary implementation of antenna 370 is shown in FIG. 3. Segment 372 of antenna 370 receives satellite signals while segment 376 receives primarily jamming signals. PCB 374 is situated between segment 372 and segment 376 of antenna 370.

In the present example, antenna array 302 is an array of 16 antennas arranged in four rows and four columns. However, any other number of antennas with various number of rows or columns may be used according to the present disclosure. Satellite communication signals received by the multiple antennas in antenna array 302 are provided to LNAs 304 for amplification and the output of LNAs 304 is provided to ADC module 306 which converts the analog outputs corresponding to each antenna in antenna array 302 to digital signals. The digital output of ADC module 306 is provided to gain and phase adjustment module 308, which can vary the gain and phase of each digital output corresponding to each antenna in antenna array 302. The gain and phase adjusted and digitized outputs of all antennas provided by antenna array 302 and LNAs 304 are combined in summing module 312 to generate PAA output 310. It is noted that in the exemplary implementation in FIG. 3, PAA output 310 is produced in digital form by combining the digitized outputs of all antennas provided by antenna array 302 and LNAs 304. PAA output 310 will be used in an LMS-based jamming removing system as will be discussed further below.

Although PAA 200 is implemented in analog domain, while PAA 300 is implemented in digital domain, as known in the art a hybrid implementation is also possible wherein the output of the PAA is formed by a combination of analog and digital techniques.

Figure 4:
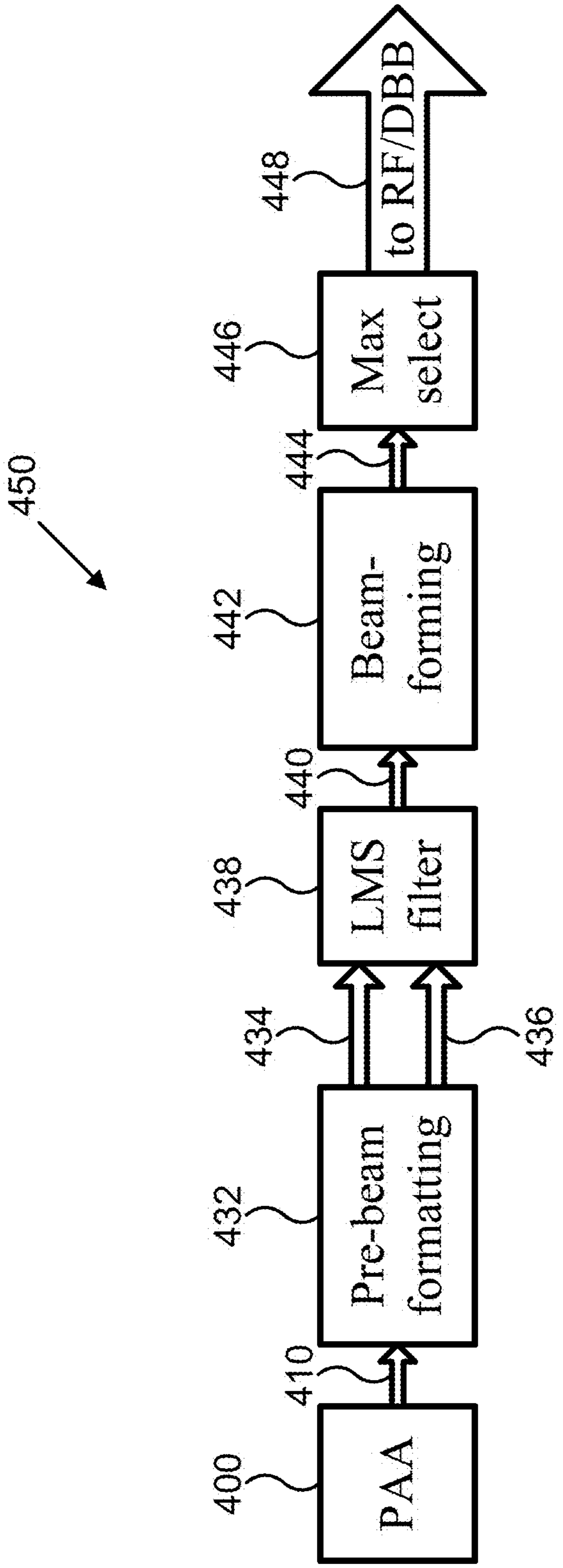
FIG. 4 shows an exemplary implementation of an LMS-based satellite communications system for removing jamming signals according to the present application.

In one exemplary implementation, the output of the PAA, achieved by analog, digital, or a hybrid combination discussed above, is utilized in LMS-based satellite communications system 450 for removing jamming signals. Referring to FIG. 4, PAA 400 provides PAA output 410 to pre-beam formatting block 432. PAA 400 and PAA output 410 can correspond to, for example, PAA 200 and PAA output 210, or alternatively, PAA 300 and PAA output 310, or any other suitable PAA implementation known in the art.

Pre-beam formatting block 432 forms preliminary desired beams 434 and omni beams 436 and provides them to LMS filter block 438. Omni beams 436 include desired beams in addition to undesired signals such as jamming signals. The number of LMS filters in LMS filter block 438 corresponds to the number of antennas in the antenna array of the PAA. For example, since either PAA 200 or PAA 300 have 16 antennas in their respective antenna arrays 202 and 302, when PAA 400 is implemented as either PAA 200 or PAA 300, 16 LMS filters will be used in LMS filter block 438.

LMS filter block 438 estimates the filter weights and minimizes the error between a desired signal and an observed signal using the mean square error (MSE) criteria. LMS filter block 438 adapts its weights until the error between the received data and the desired data is minimal. LMS filter block 438 accepts scalar and vector inputs of real and complex types. LMS filter block 438 minimizes the error based on preliminary desired beams 434 and omni beams 436 and outputs filtered beams 440 that are substantially free of jamming signals.

Filtered beams 440 of LMS filter block 438 are provided to beamforming block 442 which produces directed filtered beams 444 that are provided to max select block 446. There are multiple directed filtered beams 444 since generally one or more beam is directed to each satellite, and since there are multiple satellites (for example multiple GPS satellites), there are multiple directed filtered beams 444. Max select block 446 selects directed filter beams that have the highest energy correlation with wanted satellites. Thus, output 448 of max select block 446 comprises at least one selected directional beam that is highly correlated with communication signals from at least one satellite. For example, for GPS, there are presently up to 32 satellites, whose signals are desired to be received without interference from jammers. LMS-based satellite communications system 450 receives ranging codes and preambles of several of these 32 satellites and max select block 446 may assist in precisely identifying 8 to 12 of the GPS satellites by determining strongest correlations of multiple directed filtered beams 444 with ranging codes or preambles of GPS satellites. As another example, for Iridium satellite network, max select block 446 may assist in precisely identifying up to three Iridium satellites by determining strongest correlations of multiple directed filtered beams 444 with preamble sequence of Iridium satellites.

Output 448 of max select block 446, comprising at least one selected directional beam that is highly correlated with communication signals from at least one satellite, is either converted to RF signals and fed to a generic GNSS receiver, for example a GPS receiver, or is fed to a digital baseband (DBB) block and processed by a DSP (digital signal processor). Output 448 of LMS-based satellite communications system 450 is substantially free of jamming signals and other interference sources.

LMS-based satellite communications system 450 for removing jamming signals presents several advantages over conventional techniques. For example, jamming removing system 450 has a fast settling time of less than one millisecond, in contrast to tens of milliseconds needed for conventional systems such as CRPA to compute several nulls. The fast settling time of LMS filter block 438 makes jamming removing system 450 suitable in communications with high mobility vehicles such as airplanes. In addition, while scatterings is a significant problem in other techniques like CRPA and limit the applications in reflection-rich environment, scatterings (reflections) of the jammers do not affect the cancellation algorithm in the present implementation, because LMS filter block 438 minimizes errors caused by all replicas. Moreover, LMS-based jamming removing system 450 in the present implementation has a gain towards satellites, which increases SNR (signal to noise ratio) of received signal and improves the quality of the reception. Other systems like CRPA do not have any gain towards satellites because all resources are used to form multiple nulls. LMS-based jamming removing system 450 of the present implementation provides an anti-jamming technique against LEO (low earth orbit) and MEO (medium earth orbit) satellite services and can be used for PNT (position, navigation, timing) enhancements.

Figure 5:
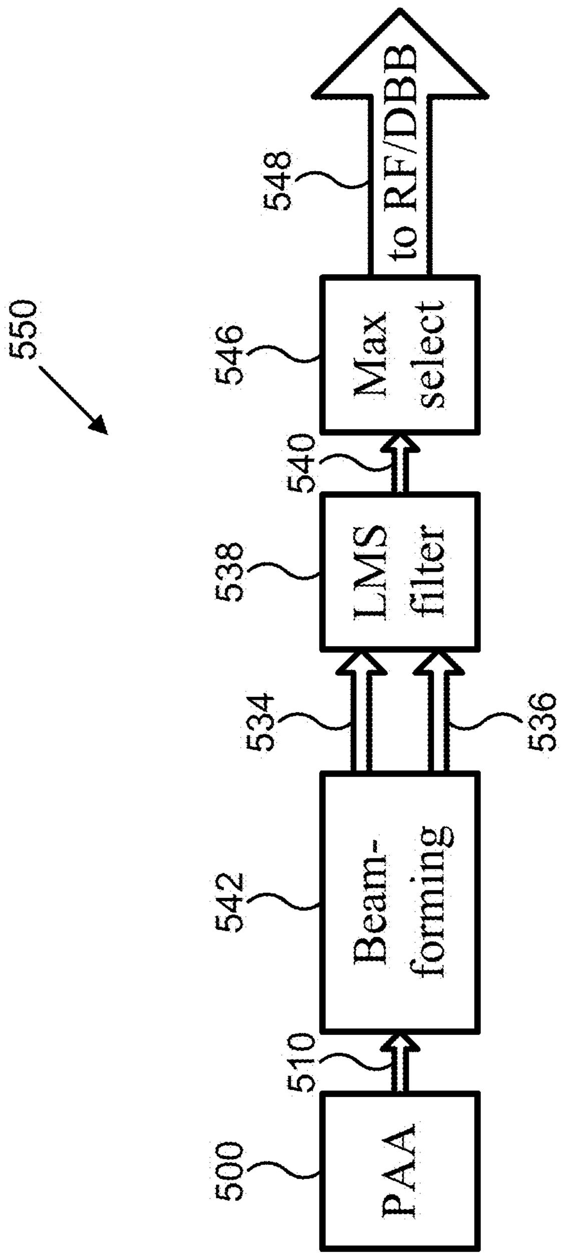
FIG. 5 shows another exemplary implementation of an LMS-based satellite communications system for removing jamming signals according to the present application.

In another exemplary implementation, the output of the PAA, achieved by analog, digital, or a hybrid combination discussed above, is utilized in LMS-based satellite communications system 550 for removing jamming signals. Referring to FIG. 5, PAA 500 provides PAA output 510 to beamforming block 542. PAA 500 and PAA output 510 can correspond to, for example, PAA 200 and PAA output 210, or alternatively, PAA 300 and PAA output 310, or any other suitable PAA implementation known in the art.

Beamforming block 542 provides directed desired beams 534 and omni beams 536 to LMS filter block 538. Omni beams 536 include desired beams in addition to undesired signals such as jamming signals. Directed desired beams 534 generally include one or more beam directed to each satellite, and since there are multiple satellites (for example multiple GPS satellites), directed desired beams 534 comprise multiple beams. The number of LMS filters in LMS filter block 538 corresponds to the number of beams outputted by beamforming block 542. LMS filter block 538 estimates the filter weights and minimizes the error between a desired signal and an observed signal using the mean square error (MSE) criteria. LMS filter block 538 adapts its weights until the error between the received data and the desired data is minimal. LMS filter block 538 minimizes the error based on directed desired beams 534 and omni beams 536 and outputs directed filtered beams 540 that are substantially free of jamming signals.

Directed filtered beams 540 of LMS filter block 538 are provided to max select block 546. There are multiple directed filtered beams 540 since generally one or more beam is directed to each satellite, and since there are multiple satellites (for example multiple GPS satellites), there are multiple directed filtered beams 540. Max select block 546 selects directed filter beams that have the highest energy correlation with wanted satellites. Thus, output 548 of max select block 546 comprises at least one selected directional beam that is highly correlated with communication signals from at least one satellite. For example, for GPS, there are presently up to 32 satellites, whose signals are desired to be received without interference from jammers. LMS-based satellite communications system 550 receives ranging codes and preambles of several of these 32 satellites and max select block 546 may assist in precisely identifying 8 to 12 of the GPS satellites by determining strongest correlations of multiple directed filtered beams 540 with ranging codes or preambles of GPS satellites. As another example, Iridium satellite network max select block 546 may assist in precisely identifying up to three Iridium satellites by determining strongest correlations of multiple directed filtered beams 540 with preamble sequence of Iridium satellites.

Output 548 of max select block 546, comprising at least one selected directional beam that is highly correlated with communication signals from at least one satellite, is either converted to RF signals and fed to a generic GNSS receiver, for example a GPS receiver, or is fed to a digital baseband (DBB) block and processed by a DSP. Output 548 of LMS-based satellite communications system 550 is substantially free of jamming signals and other interference sources. LMS-based satellite communications system 550 for removing jamming signals presents all of the advantages over conventional techniques that were discussed above in relation to LMS-based satellite communications system 450 of FIG. 4.

Figure 6:
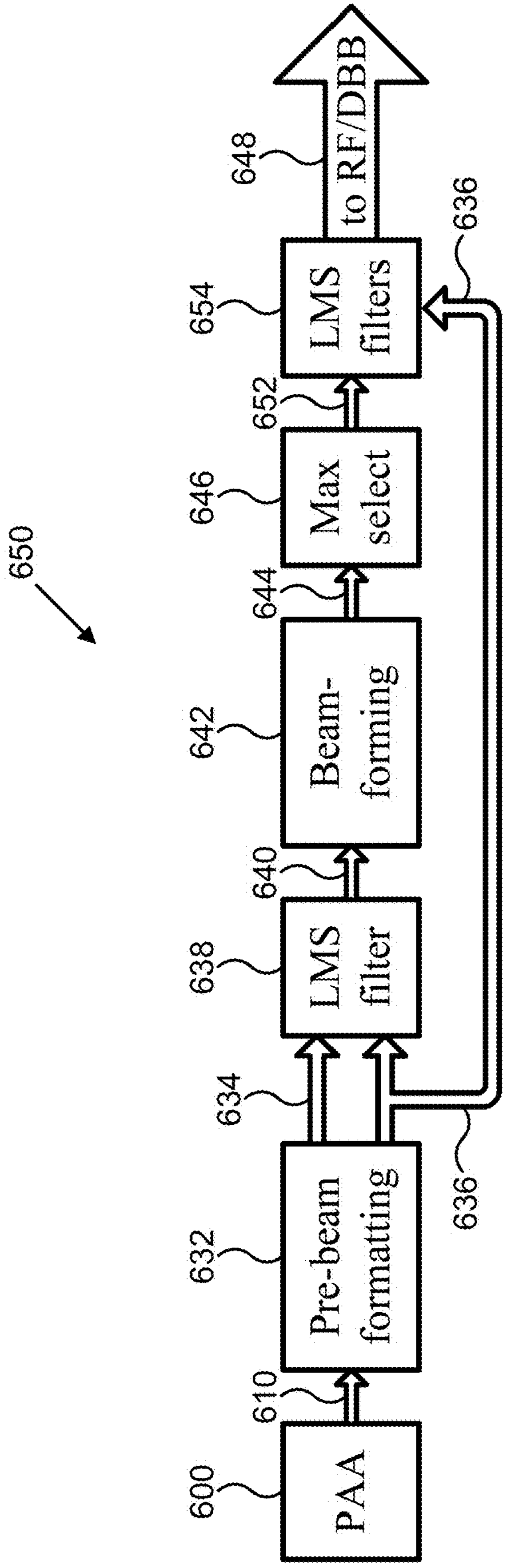
FIG. 6 shows yet another exemplary implementation of an LMS-based satellite communications system for removing jamming signals according to the present application.

In yet another exemplary implementation, the output of the PAA, achieved by analog, digital, or a hybrid combination discussed above, is utilized in LMS-based satellite communications system 650 for removing jamming signals. Referring to FIG. 6, PAA 600 provides PAA output 610 to pre-beam formatting block 632. PAA 600 and PAA output 610 can correspond to, for example, PAA 200 and PAA output 210, or alternatively, PAA 300 and PAA output 310, or any other suitable PAA implementation known in the art.

Pre-beam formatting block 632 forms preliminary desired beams 634 and omni beams 636 and provides them to LMS filter block 638. Omni beams 636 include desired beams in addition to undesired signals such as jamming signals. LMS filter block 638 estimates the filter weights and minimizes the error between a desired signal and an observed signal using the mean square error (MSE) criteria. LMS filter block 638 adapts its weights until the error between the received data and the desired data is minimal. LMS filter block 638 accepts scalar and vector inputs of real and complex types. LMS filter block 638 minimizes the error based on preliminary desired beams 634 and omni beams 636 and outputs filtered beams 640 that are substantially free of jamming signals.

Filtered beams 640 of LMS filter block 638 are provided to beamforming block 642 which produces directed filtered beams 644 that are provided to max select block 646. There are multiple directed filtered beams 644 since generally one or more beam is directed to each satellite, and since there are multiple satellites (for example multiple GPS satellites), there are multiple directed filtered beams 644. Max select block 646 selects directed filter beams that have the highest energy correlation with wanted satellites. Thus, output 652 of max select block 646 comprises at least one selected directional beam that is highly correlated with communication signals from at least one satellite. For example, for GPS, there are presently up to 32 satellites, whose signals are desired to be received without interference from jammers. LMS-based satellite communications system 650 receives ranging codes and preambles of several of these 32 satellites and max select block 646 may assist in precisely identifying 8 to 12 of the GPS satellites by determining strongest correlations of multiple directed filtered beams 644 with ranging codes or preambles of GPS satellites. As another example, Iridium satellite network max select block 646 may assist in precisely identifying up to three Iridium satellites by determining strongest correlations of multiple directed filtered beams 644 with preamble sequence of Iridium satellites.

In the implementation of LMS-based satellite communications system 650, output 652 of max select block 646 is provided to another LMS filter block, i.e. LMS filter block 654. LMS filter block 654 also receives omni beams 636 from pre-beam formatting block 632. The number of LMS filters in LMS filter blocks 638 and 654 corresponds to the number of antennas in the antenna array of the PAA 600 plus the number of beams outputted by beamforming block 642.

Output 648 of LMS filter block 654 is either converted to RF signals and fed to a generic GNSS receiver, for example a GPS receiver, or is fed to a digital baseband (DBB) block and processed by a DSP. Output 648 of LMS-based satellite communications system 650 is substantially free of jamming signals and other interference sources. LMS-based satellite communications system 650 for removing jamming signals presents all of the advantages over conventional techniques that were discussed above in relation to LMS-based satellite communications system 450 of FIG. 4.

While the implementations of the present disclosure discussed in relation to FIGS. 1 through 6 described removing jamming signals from communication signals sent from a satellite that are being received by, for example a terrestrial station, all implementations described in relation to FIGS. 1 through 6 apply equally to removing jamming signals from communications signals sent from, for example a terrestrial station, that are being received by a satellite. It is also noted that while the present disclosure has made specific references to GNSS receivers, the present application applies equally to receivers in other types of satellite networks, including any non-GNSS receiver, including, but not limited to, an Iridium receiver, an Inmarsat receiver, a Fugro receiver, and a Starlink receiver.

Various implementations of the present disclosure result in robust anti-jamming systems that remove jamming signals in satellite communications with little delay and are suitable in communications with high mobility vehicles such as airplanes, while producing gain towards incoming satellite signals and significantly improving satellite signal reception. It is noted that, in addition to satellite communications, the present inventive concepts can be implemented to more advantageously utilize LMS-based jamming removing systems in various fields, such as radar systems, wireless communication systems, and wireless networks.

The present application has disclosed various exemplary implementations that result in clock systems with accuracy exceeding that of many atomic clocks while being less expensive and more resilient than atomic clocks. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A system comprising:

a plurality of antennas in a phased antenna array (PAA), said plurality of antennas receiving communication signals from at least one satellite, said plurality of antennas further receiving jamming signals;

a pre-beam formatting block receiving said PAA's output and forming preliminary desired beams and omni beams;

a first least mean squares (LMS) filter block receiving said preliminary desired beams and said omni beams and outputting a plurality of filtered beams that are substantially free of said jamming signals;

a beamforming block receiving said plurality of filtered beams and outputting a plurality of directed filtered beams;

a max select block receiving said plurality of directed filtered beams and outputting at least one selected directional beam that is highly correlated with said communication signals from said at least one satellite, wherein said at least one selected directional beam is substantially free of said jamming signals.

2. The system of claim 1, wherein said selected directional beam is provided to a second LMS filter block, said second LMS filter block further removing said jamming signals from said selected directional beam.

3. The system of claim 2, wherein said pre-beam formatting block provides said omni beams to said second LMS filter block.

4. The system of claim 3, wherein said PAA comprises an antenna array coupled to a group of LNAs, said group of LNAs providing an output to a gain and phase adjustment module, said gain and phase adjustment module being coupled to a summing module that provides said PAA's output.

5. The system of claim 3, wherein said PAA comprises an antenna array coupled to a group of LNAs, said group of LNAs providing an output to a group of ADCs coupled to a gain and phase adjustment module, said gain and phase adjustment module being coupled to a summing module that provides said PAA's output.

6. The system of claim 3, wherein said at least one selected directional beam is provided to a GNSS receiver or a GPS receiver by said second LMS filter block, wherein said jamming signals have been further removed from said at least one selected directional beam.

7. The system of claim 3, wherein said at least one selected directional beam is provided to a non-GNSS receiver including, but not limited to, an Iridium receiver, an Inmarsat receiver, a Fugro receiver, and a Starlink receiver, by said second LMS filter block, wherein said jamming signals have been further removed from said at least one selected directional beam.

8. The system of claim 1, wherein said PAA comprises an antenna array coupled to a group of LNAs, said group of LNAs providing an output to a gain and phase adjustment module, said gain and phase adjustment module being coupled to a summing module that provides said PAA's output.

9. The system of claim 1, wherein said PAA comprises an antenna array coupled to a group of LNAs, said group of LNAs providing an output to a group of ADCs coupled to a gain and phase adjustment module, said gain and phase adjustment module being coupled to a summing module that provides said PAA's output.

10. The system of claim 1, wherein said at least one selected directional beam is provided to a GNSS receiver or a GPS receiver.

11. The system of claim 1, wherein said at least one selected directional beam is provided to a non-GNSS receiver including, but not limited to, an Iridium receiver, an Inmarsat receiver, a Fugro receiver, and a Starlink receiver.

12. A system comprising:

a plurality of antennas in a phased antenna array (PAA), said plurality of antennas receiving communication signals from at least one satellite, said plurality of antennas further receiving jamming signals;

a beamforming block receiving said PAA's output and forming directed desired beams and omni beams, said directed desired beams and said omni beams being provided to a least mean squares (LMS) filter block;

said LMS filter block outputting a plurality of directed filtered beams from which are substantially free of said jamming signals;

a max select block receiving said plurality of directed filtered beams and outputting at least one selected directional beam that is highly correlated with said communication signals from said at least one satellite, wherein said at least one selected directional beam is substantially free of said jamming signals.

13. The system of claim 12, wherein said PAA comprises an antenna array coupled to a group of LNAs, said group of LNAs providing an output to a gain and phase adjustment module, said gain and phase adjustment module being coupled to a summing module that provides said PAA's output.

14. The system of claim 12, wherein said PAA comprises an antenna array coupled to a group of LNAs, said group of LNAs providing an output to a group of ADCs coupled to a gain and phase adjustment module, said gain and phase adjustment module being coupled to a summing module that provides said PAA's output.

15. The system of claim 12, wherein said at least one selected directional beam is provided to a GNSS receiver or a GPS receiver.

16. The system of claim 12, wherein said at least one selected directional beam is provided to a non-GNSS receiver including, but not limited to, an Iridium receiver, an Inmarsat receiver, a Fugro receiver, and a Starlink receiver.

17. A system comprising:

a plurality of antennas in a phased antenna array (PAA), said plurality of antennas receiving communication signals from at least one terrestrial station, said plurality of antennas further receiving jamming signals;

a pre-beam formatting block receiving said PAA's output and forming preliminary desired beams and omni beams;

a first least mean squares (LMS) filter block receiving said preliminary desired beams and said omni beams and outputting a plurality of filtered beams that are substantially free of said jamming signals;

a beamforming block receiving said plurality of filtered beams and outputting a plurality of directed filtered beams;

a max select block receiving said plurality of directed filtered beams and outputting at least one selected directional beam that is highly correlated with said communication signals from said at least one terrestrial station, wherein said at least one selected directional beam is substantially free of said jamming signals.

18. The system of claim 17, wherein said selected directional beam is provided to a second LMS filter block, said second LMS filter block further removing said jamming signals from said selected directional beam.

19. The system of claim 18, wherein said pre-beam formatting block provides said omni beams to said second LMS filter block.

20. The system of claim 19, wherein said PAA comprises an antenna array coupled to a group of LNAs, said group of LNAs providing an output to a gain and phase adjustment module, said gain and phase adjustment module being coupled to a summing module that provides said PAA's output.

21. The system of claim 17, wherein said PAA comprises an antenna array coupled to a group of LNAs, said group of LNAs providing an output to a gain and phase adjustment module, said gain and phase adjustment module being coupled to a summing module that provides said PAA's output.

* * * * *